July 30, 1940.  W. P. WILLS  2,209,369
MEASURING AND CONTROL APPARATUS
Filed Sept. 24, 1938   2 Sheets-Sheet 1

INVENTOR.
WALTER P. WILLS
BY George N. Murnbaugh
ATTORNEY.

July 30, 1940.   W. P. WILLS   2,209,369
MEASURING AND CONTROL APPARATUS
Filed Sept. 24, 1938   2 Sheets-Sheet 2

INVENTOR.
WALTER P. WILLS
BY [signature]
ATTORNEY.

Patented July 30, 1940

2,209,369

UNITED STATES PATENT OFFICE 2,209,369

MEASURING AND CONTROL APPARATUS

Walter P. Wills, Philadelphia, Pa., assignor to The Brown Instrument Company, Philadelphia, Pa., a corporation of Pennsylvania Application September 24, 1938, Serial No. 231,566

19 Claims. (Cl. 172—239)

The present invention relates to improvements in automatic recording and control systems and apparatus therefor.

More specifically the invention relates to systems and apparatus for determining the magnitude or changes in magnitude of a measured condition, such as mechanical, chemical, electrical, physical, etc. and including suitable provisions for making a record of the changes and/or for maintaining said measured condition at a predetermined value. The invention is especially useful in pyrometric recording and control systems where it is desired to record and control the conditions of temperature at one or more remote points, for example in furnaces or kilns.

In accordance with my invention, upon change in magnitude of a measured condition, a normally balanced electrical network becomes unbalanced and initiates operation of a driving system for effecting a rebalancing adjustment of the network, and during the rebalancing operation an additional effect is produced which jointly with the unbalance of the network controls the driving system to obtain rebalance in a minimum of time without overshooting. Such provisions for preventing overshooting of the balance point of the network are desirable since the inertia of the various mechanically connected parts tend to so operate as to carry the driving system and associated rebalancing means beyond the proper position of rebalance. When such a condition of overshooting prevails, the network then becomes unbalanced in the opposite direction and initiates operation of the driving system to obtain rebalance but again the necessary regulation is exceeded to thereby set up a continuous hunting of the driving system about the balance point.

The need for such "anti-hunting" provisions in recording and controlling apparatus has long been recognized and various methods have been proposed heretofore for obtaining the same. One such prior art method for preventing hunting is disclosed in Patent 1,827,520 issued to Thomas R. Harrison on October 13, 1931, for Recording and control system and apparatus therefor, in which the speed of rebalance of an electrical network is effected in accordance with extent of unbalance thereof, and mechanically moving means are provided for anticipating the true balance position. In one other prior art method means are provided in the form of a generator driven by the driving system for obtaining an electromotive force proportional to the speed of the driving system. This electromotive force is introduced into the measuring or detector circuit in opposition to the unbalance electromotive force of the condition responsive network and operates to produce a condition of simulated rebalance of said network before the latter is actually rebalanced to thereby anticipate the true balance position of the network. As a result the driving system is slowed down before the balance position is reached and then gradually eases into said balance position without exceeding that position.

A specific object of my present invention is to provide anti-hunting means for use in recording and controlling apparatus in which an electromotive force proportional to the speed of rebalancing of the measuring network is obtained without requiring the use of a generator or other physically moving device additoinal to the rebalancing motive means.

A further object of the invention is to provide a measuring and/or controlling system which is characterized by its compactness, simplicity, and effectiveness, and which may be operated from a commercial alternating current supply source without the use of transformers and power rectifiers.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

Figure 1:
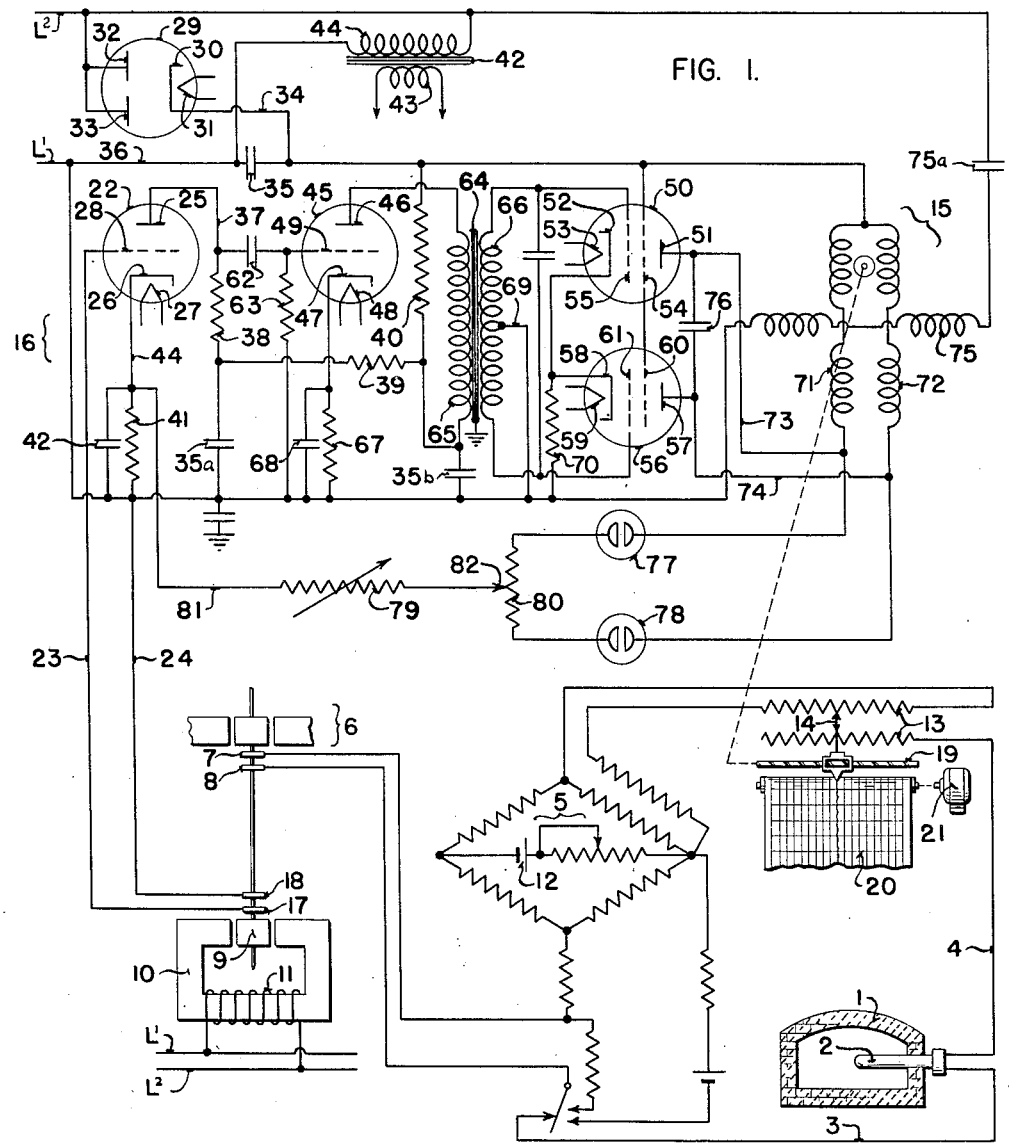
Fig. 1 is a diagrammatic illustration of a self balancing potentiometric network utilizing the invention.

In Fig. 1 of the drawings, an arrangement including an electronic device to be described is illustrated for producing effects in accordance with the extent of unbalance of a potentiometric network which controls the electronic device and is unbalanced in accordance with variations in a quantity to be measured, and in which because of the small magnitude of the unbalanced electromotive forces produced in the network, it is not practical nor desirable to have the said effects directly produced by the potentiometric network.

More specifically, an arrangement is illustrated in Fig. 1 for measuring and recording the temperature of a furnace 1 in the interior of which a thermocouple 2 is inserted and is responsive to slight changes in the temperature therein. The terminals of the thermocouple are connected by conductors 3 and 4 to the terminals of a null point potentiometric network 5 which may be of any suitable type such as the Brown potentiometric network disclosed in the Harrison Patent 1,898,124 issued February 21, 1933.

The moving coil of a galvanometer 6 is connected in the conductor 3 by means of pigtails or slip rings 7 and 8 and a pick-up coil 9 which is positioned in an alternating magnetic field is connected to the pivot of the galvanometer coil and is arranged to be rotated therewith. This pick-up coil is positioned between the poles of a suitable field structure 10 on which is wound a field winding 11 which is energized from alternating current supply conductors $L^1$, $L^2$ and is so arranged with respect to the poles of the field structure 10 that when the galvanometer moving coil is in its undeflected position, the pick-up coil is in zero inductive relation to the alternating magnetic field set up in the field structure. When the galvanometer moving coil deflects in one direction or the other, the pick-up coil deflects accordingly and as a result, an alternating voltage, in phase with or 180° out of phase with the line voltage, will be induced in the pick-up coil. The potentiometer network 5 is of a well known type and it is sufficient for the present purposes to know that the potentiometer network includes a circuit branch including the thermocouple 2 and an opposing circuit branch including a source of known potential such as a battery 12, resistances 13, a variable portion of which may be connected into the opposed branches by means of a sliding contact 14 whereby the respective effects of the variable and known sources are made equal and opposite and the galvanometer moving coil is then rendered undeflected when the circuit is balanced for a given value of the E. M. F. of the thermocouple 2 with contact 14 in a corresponding position along resistances 13. The position of the contact 14 is then a measure of the value of the thermocouple E. M. F. and may serve as a measure of the temperature to which it is exposed.

This form of my invention is concerned with the means by which the contact 14 is adjusted back and forth along resistances 13 in response to galvanometer deflection and as shown includes a reversible motor 15 which is adapted to be selectively energized for rotation in one direction or the other from an electronic amplifier 16. When the thermocouple voltage changes, the galvanometer moving coil will be deflected in one direction or the other and thereby the pick-up coil 9 will be rotated into inductive relation with the alternating magnetic field set up by the field structure 10 resulting in the induction of an alternating voltage in the pick-up coil. The phase and amplitude of the alternating voltage so induced is determined by the direction and extent of deflection respectively. This induced alternating voltage is connected through suitable pigtails or slip rings 17 and 18 to the input terminals of amplifier 16 so that depending upon the direction of galvanometer deflection, the motor 15 will be energized for rotation in a corresponding direction to effect an adjustment of the sliding contact 14 along resistances 13 to rebalance the potentiometric circuit.

The shaft of motor 15 is connected in any convenient manner to a screw shaft 19 and the potentiometer contact 14 is mounted on a carriage 5 carried by shaft 19 and is adapted to be moved in one direction or the other as the shaft 19 is rotated. Thus when the motor 15 is energized for rotation as a result of change in the thermocouple E. M. F., the motor will effect an adjusting movement of contact 14 along resistances 13 in the proper direction until the potentiometer circuit is again balanced. The galvanometer deflection will then be reduced to zero and the motor will come to rest with the contact 14 at a new position along resistances 13, which position will then be a measure of the temperature of the interior of furnace 1.

If desired, a pen may be mounted on the carriage which carries the potentiometer contact 14 and arranged in cooperative relation with a recorder chart 20 to thereby provide a continuous record of the temperature of the interior of furnace 1. The chart 20 may be a strip chart as shown and is adapted to be driven in any convenient manner as for example by a unidirectional motor 21 through suitable gearing (not shown) so that a record of the temperature to which the thermocouple 2 is subjected will be recorded as a continuous line on the chart.

The electronic amplifier 16 referred to includes an electronic valve 22 on the input circuit of which the voltage induced in pick-up coil 9, as a result of galvanometer deflection, is applied by conductors 23 and 24. Valve 22 is a heater type triode and, as shown, includes an anode 25, a cathode 26, a heater filament 27, and a control grid 28. Anode voltage is supplied valve 22 from the alternating current supply conductors $L^1$ and $L^2$ through a circuit which utilizes the rectifying action of a rectifier valve 29. Valve 29 may be of any well known type, and is illustrated as a heater type including a cathode 30, a heater filament 31, and a pair of anodes 32 and 33 which are connected together.

The circuit referred to above for supplying anode voltage to valve 22 may be traced from the supply conductor $L^2$ to the anodes 32 and 33 of valve 29, cathode 30, and a conductor 34 to one terminal of a condenser 35, which terminal constitutes the positive side of a half wave rectifying unit. The negative terminal of condenser 35 is connected by a conductor 36 to the supply conductor $L^1$. As will be apparent, condenser 35 operates to smooth out the pulsations in the rectified current flow through the valve 29, which impresses a definite constant voltage across its terminals. The anode 25 of valve 22 is connected to the positive terminal of condenser 35 by a conductor 37 in which a series of resistances 38, 39 and 40 are inserted, and the cathode 26 is connected to the negative terminal thereof through a biasing resistance 41 shunted by a condenser 42. As illustrated, a condenser 35a connected from the point of engagement of resistances 38 and 39 to the negative terminal of condenser 35 may desirably be provided for further filtering the anode voltage impressed on valve 22.

Energizing current is supplied the heater filaments 27 and 31 of valves 22 and 29, respectively, from the secondary winding 43 of a transformer 42. Transformer 42 is a step-down transformer having a line voltage primary winding 44 whose terminals are connected to the supply conductors $L^1$ and $L^2$. The secondary winding 43 also supplies energizing current to the heater filaments 48, 53, and 59 of electronic valves 45, 50, and 56, respectively, which valves are also included in the amplifier 16, and will be described further hereinafter. While the connecting leads from the heater filaments 27, 31, 48, 53 and 59 to the transformer secondary winding 43 have not been shown in order not to confuse the drawings, the said filaments may be connected in any suitable manner to the terminals of the winding 43, for example, in parallel across said terminals.

The output circuit of valve 22 is resistance capacity coupled by a condenser 62 and a resistance 63 to the input circuit of valve 45, and the output circuit of the latter is coupled by a transformer 64 having a primary winding 65 and a center tapped secondary winding 66 to the input circuits of the valves 50 and 56 which, as shown, are connected in push-pull relation. Valve 45 is a heater type triode and includes an anode 46, a cathode 47, the heater filament 48, and a control grid 49. Anode voltage is supplied valve 45 from the terminals of condenser 35 through a circuit which may be traced from the positive terminal of condenser 35 through resistance 40, the primary winding 65 of transformer 64 and therethrough to the anode 46 of valve 45, cathode 47, and a biasing resistance 67, shunted by a condenser 68, to the negative terminal of the condenser 35. As shown, a condenser 35b connected from the point of engagement of resistance 40 and the transformer primary winding 65 to the negative end of the biasing resistor 67 is provided for further filtering the anode voltage supplied valve 45.

The center tap on the transformer secondary winding 66 is connected by a conductor 69 to the negative terminal of condenser 35 and is also connected through a biasing resistance 70 to the cathodes 52 and 58 of valves 50 and 56, respectively. Valves 50 and 56 are heater type tetrodes and, as illustrated, valve 50 includes an anode 51, the cathode 52 and heater filament 53, a screen grid 54, and a control grid 55, and valve 56 includes an anode 57, the cathode 58 and heater filament 59, a screen grid 60 and a control grid 61. One terminal of the secondary winding 66 is connected to the control grid 55 of valve 50 and the other terminal of the secondary winding is connected to the control grid 61 of valve 56.

Anode voltage is supplied valve 50 from the terminals of condenser 35 through a circuit which includes one phase winding 71 of the reversible electrical motor 15, and may be traced from the positive terminal of the condenser through phase winding 71 of motor 15, a conductor 73, the anode 51 of valve 50, cathode 52 and the biasing resistance 70 to the negative terminal of the condenser. Similarly, anode voltage is supplied valve 56 from the terminals of condenser 35 through a circuit which includes a motor phase winding 72 which is oppositely disposed on the motor 15 with respect to the winding 71. The anode circuit of valve 56 may be traced from the positive terminal of condenser 35 to the phase winding 72, a conductor 74, anode 57 of valve 56, cathode 58, and the biasing resistance 70 to the negative terminal of the condenser.

In operation when the potentiometric network 5 is unbalanced, the pick-up coil 9 will be deflected in one direction or the other to cause the induction therein of an alternating voltage which is in phase with the line voltage or displaced 180° therefrom. This alternating voltage is applied by means of conductors 23 and 24 to the input circuit of valve 22, and is effective to render the valve 22 alternately conductive and non-conductive, the periods of such alternate conduction and non-conduction being determined by the direction of deflection of pick-up coil 9. The pulsating currents conducted by valve 22 produce a pulsating potential drop across resistance 38 which is impressed through condenser 62 and resistance 63 to the input circuit of valve 45 to thereby render the latter alternately nonconductive and conductive during the periods when the valve 22 is conductive and non-conductive, respectively. The flow of pulsating anode current conducted by valve 45 through the transformer primary winding 65 causes the induction of an alternating voltage across the terminals of the transformer secondary winding 66, which voltage is impressed on the input circuits of valves 50 and 56. The alternating voltage which appears across the terminals of the transformer winding 66 swings the potentials of the control grids 55 and 61 in opposite phase at a frequency corresponding to the supply line frequency, and thereby renders valves 50 and 56 alternately conductive and non-conductive, one valve being conductive while the other is non-conductive. The resulting pulsating current flows through the motor phase windings 71 and 72 result in energization of the motor 15 for rotation in one direction or the other depending upon the phase relation of the voltage induced in the transformer secondary winding 66 with respect to the line voltage.

Figure 2:
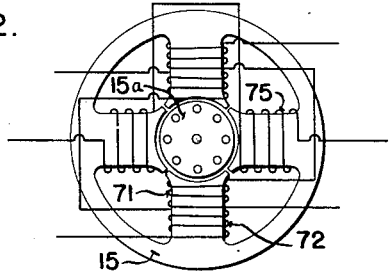
Fig. 2 illustrates in detail the reversible electrical motor employed in the arrangement of Fig. 1.

As illustrated more or less diagrammatically in Fig. 2, the motor 15 is of the induction variety and includes three windings, namely the windings 71 and 72 referred to hereinbefore and a winding 75 which is connected directly to the alternating current supply conductors $L^1$ and $L^2$ through a condenser 75a. Due to the action of condenser 75a the current which flows through winding 75 will lead the line current by approximately 90°. As shown in Fig. 2, motor 15 includes a squirrel cage rotor 15a and two pairs of oppositely disposed field poles. Winding 75 is wound on one pair of said oppositely disposed field poles, and windings 71 and 72 are wound on the other pair of poles, one half of winding 71 being wound on a portion of one of the field poles which is adjacent the rotor 15a, and the other half being wound on a portion of the other field pole remote from said rotor. Similarly, one half of winding 72 is wound on a portion of the last mentioned pole which is adjacent the rotor 15a, and the other half of winding 72 is wound on a portion of the first mentioned pole remote from said rotor.

In operation when the voltage induced in the transformer secondary winding 66 is zero, valves 50 and 56 will conduct a steady value of current and motor 15 will not be energized for rotation in either direction. When a voltage of one phase or of opposite phase with respect to the line voltage is induced in the transformer secondary winding 66, however, magnetic fields will be set up by the windings 71 and 72 which are so positioned in space and time with respect to the magnetic fields set up by the winding 75, that a resultant rotating magnetic field will be produced in the rotor 15a which is effective to cause rotation of the latter in one direction or the other depending upon the phase of said voltage induced in the winding 66.

In order that the speed of motor 15 may be as great as possible during rebalancing without overshooting of the new balance point of the potentiometric network 5 and consequent hunting taking place, means have been provided to insure that the motor speed and rate of change of its speed is substantially proportional to the extent of unbalance. This result is obtained by introducing into the network a voltage whose magnitude is a function of the motor speed, and whose phase is determined by the direction of rotation thereof.

This damping feature, although obtained electrically herein, is substantially the same as that disclosed in the Harrison Patent 1,827,520 mentioned hereinbefore in which the rate of rebalance of a potentiometer measuring circuit and an arresting of the motive means when the rebalancing movement has been proportional to the unbalance are controlled by mechanical means. Thus, as the sliding contact 14 approaches its new balanced position the potentiometer unbalance will be reduced, and if the motor speed is then such that it will ordinarily coast beyond the balanced position due to its inertia, the opposing voltage which is introduced into the network will be appreciably greater than the voltage impressed on the amplifier input circuit by the pick-up coil 9, and will tend to effect energization of the motor in the opposite direction, and thereby produces a positive damping action which will check the motor speed before the balanced position is reached, and gradually reduce it to zero as the unbalance is reduced to zero.

Specifically, the means illustrated in Fig. 1 for obtaining such an anti-hunting effect includes a pair of neon lamps 77 and 78 and an associated pair of resistances 79 and 80 which are connected from one pair of terminals of the motor phase windings 71 and 72 to the input circuit of the electronic valve 22. As shown, one terminal of the neon lamp 77 is connected to the conductor 73, which conductor joins the motor phase winding 71 and the anode 51 of valve 50, and the other terminal thereof is connected to one end of the resistance 80. One terminal of the neon lamp 78 is connected to the conductor 74 which joins the motor phase winding 72 to the anode 57 of valve 56, and the other terminal of lamp 78 is connected to the remaining terminal of resistance 80. The cathode 26 of valve 22 is connected by a conductor 81, in which the resistance 79 is inserted, to a contact 82 which is adjustable along the resistance 80. The circuit connections just described operate in a manner elaborated on further hereinafter to impress an electromotive force across resistance 41 in the cathode circuit of valve 22, which electromotive force varies proportionately with the speed of rotation of motor 15, and has a polarity depending upon the direction of rotation of the motor.

This electromotive force for preventing hunting of motor 15 is induced in the motor windings 71 and 72 as a result of transformer action between the windings 71 and 72 and the winding 75. When motor 15a is stationary, no line of the magnetic flux set up by winding 75 link any turns of windings 71 and 72, since, as illustrated in Fig. 2, the field poles on which the windings 71 and 72 are wound, are displaced 90° with respect to the field poles on which winding 75 is wound, and hence the electromotive force induced in windings 71 and 72 by transformer action will be zero. On rotation of rotor 15a, however, the magnetic flux set up by winding 75 will be distorted, and some lines of flux will link the windings 71 and 72 to cause the induction of an electromotive force therein. By providing a condenser 76 connected between the terminals of windings 71 and 72 which are connected to the anodes 51 and 57 of valves 50 and 56, the magnitude of the voltage induced in windings 71 and 72 as a result of motor rotation will be greatly enhanced. The magnetic flux set up by winding 75 is distorted in one direction or the other, depending upon the direction or rotation of rotor 15a, and the extent of distortion is dependent upon the speed of rotation. Thus the phase of the electromotive force induced in the windings 71 and 72 is determined by the direction of rotation of motor 15, and the amplitude of said electromotive force is dependent upon the speed of rotation of said motor. As will be readily apparent, by providing a feed-back circuit as illustrated and described, this electromotive force derived as a result of motor rotation may be utilized to prevent hunting of the motor. As illustrated, the said electromotive force is impressed across the biasing resistor 41 in the cathode circuit of valve 22 and is so connected as to oppose the voltage impressed on the input circuit of valve 22 by the pick-up coil 9, so that as the motor gains speed, the damping voltage becomes predominant in controlling the action of the amplifier and tends to produce rotation of motor 15 in the opposite direction. Resistances 41, 79 and 82 are so adjusted that when the input signal impressed on the amplifier by the pick-up coil 9 is large, the feed-back voltage will be ineffective to produce rotation of the motor in the opposite direction, and will only operate to reduce the effect of the input signal. As the input signal falls off, however, the feed-back voltage becomes more and more predominant and finally tends to produce rotation of the motor in the opposite direction to thereby quickly reduce its speed. As the motor speed falls off, the feed-back voltage diminishes and, as a result, the effect of the input signal is again increased. This action continues until the potentiometer network 5 is rebalanced and permits the motor to be extremely fast in its operation without overshooting.

It will be noted that the feed-back action described for preventing hunting of motor 15 is inherently a delayed action, inasmuch as it is necessary for the motor to rotate before an electromotive force is induced in windings 71 and 72. Thus, motor 15 is given a large starting torque as soon as a signal is received from the pick-up coil 9, and after the motor has started rotating, the feed-back circuit operates to reduce the motor speed. According to my invention, moreover, means are provided for adjusting the duration of the delay in the feed-back action so that the motor 15 may be permitted to attain a predetermined speed before the feed-back circuit is rendered effective to reduce the motor speed. This feature is a desirable one since the lag between an unbalance in network 5 and the time when motor 15 starts rotating to reduce said unbalance varies with different apparatuses, and in all cases, it is to be desired that the said lag be a minimum.

The means provided for adjusting the duration of the delay in the feed-back action includes the resistance 79 which may be adjusted to vary the voltage required to render the neon lamps 77 and 78 conductive. Thus, depending upon the adjustment of resistance 79, the lamps 77 and 78 will break down and become conductive when a voltage of given value is impressed across the terminals thereof, which voltage is derived as a result of motor rotation and attains said given value when the speed of motor 15 is a corresponding value.

Figure 3:
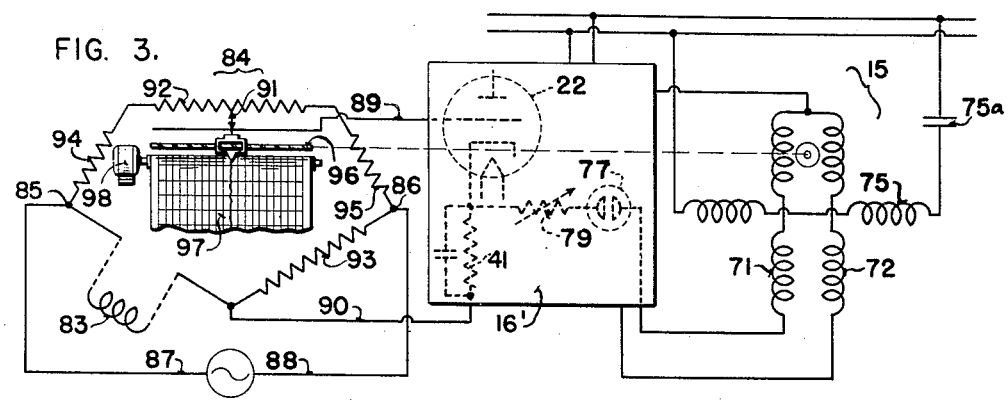

In Fig. 3, I have illustrated more or less diagrammatically a modification of the arrangement of Fig. 1 in which one of the neon lamps and an associated resistance has been dispensed with, and a self-balancing Wheatstone bridge network utilizing the invention has been disclosed. Specifically, an arrangement is illustrated in Fig. 3 for measuring and recording the temperature of a furnace (not shown) to which temperature a device 83 is responsive, said device being specifically illustrated as a coil of material having a substantial temperature coefficient of resistance and connected in one arm of the bridge network 84. Energizing current is supplied the bridge network 84 from a source of alternating current of suitable frequency and, as shown, one pair of bridge conjugate points 85 and 86 are connected by conductors 87 and 88 to said alternating current source. The other pair of bridge conjugate points are connected by conductors 89 and 90 to the terminals of an electronic amplifier 16', one of the last mentioned bridge conjugate points being the point of engagement of a sliding contact 91 with a slide wire resistance 92. The sliding contact 91 is adjusted along the resistance 92 in accordance with changes in the temperature to which the device 83 is responsive, and as will be apparent, this adjustment may conveniently be effected by a motor 15 which is selectively energized for rotation in one direction or the other by the electronic amplifier 16'. The amplifier 16' is exactly like the amplifier 16 of the Fig. 1 arrangement with the exception that the neon lamp 78 and the resistance 80 of that arrangement have been dispensed with. The remaining arms of the bridge network 84 are comprised of fixed resistances 93, 94, and 95.

On a change in the temperature of the furnace to which the device 2 is responsive, the resultant change in resistance of the latter unbalances the bridge network 84, and an unbalanced electromotive force is impressed on the equalizing conductors 89 and 90. This unbalanced electromotive force is of phase and amplitude determined by the direction and extent of change of the temperature being measured, and is impressed on the input circuit of the amplifier 16' to thereby selectively control the energization of motor 15 for rotation in one direction or the other to reduce the unbalanced electromotive force.

The shaft of motor 15 is connected in any convenient manner to a screw shaft 96, and the sliding contact 91 is mounted on a carriage carried by shaft 96 and is adapted to be moved in one direction or the other as the shaft 96 is rotated. Thus, when the motor 15 is energized for rotation as a result of the network 84 becoming unbalanced, the motor will effect an adjusting movement of the contact 91 along the slidewire resistance 92 in the proper direction until the network is again rebalanced. The motor will then come to rest with the contact 91 at a new position along the slidewire resistance 92, which position will then be a measure of the temperature to which the device 83 is subjected.

If desired, a pen may be mounted on the carriage which carries the potentiometer contact 91, and arranged in cooperative relation with a recorder chart 97 to thereby provide a continuous record of the temperature measured by the device 83. The chart 97 is a strip chart and is adapted to be driven in any convenient manner as for example, by a unidirectional motor 98 through suitable gearing (not shown) so that a record of the temperature to which the device 83 is subjected will be recorded as a continuous line on the chart. It will be apparent that the slide wire resistance 92 may be mounted on a circular form, and that a circular chart may be employed for recording purposes in lieu of the strip chart 97, if desired.

The means provided in this form of my invention for preventing overshooting and consequent hunting of motor 15 include only the neon lamp 77 and the resistance 79 connected in series between the conductor 73 and the cathode 26 of valve 22. As will be readily apparent, when motor 15 rotates in one direction or the other, a voltage will be induced in the winding 71 of one phase or of opposite phase depending upon the direction of rotation, and the magnitude of this voltage will be proportional to the speed of rotation of the motor. Similarly, a voltage will be induced in the winding 72, but it is not necessary to employ both voltages since one is sufficient for obtaining the damping action required. Hence, the lamp 78 of the Fig. 1 arrangement may be dispensed with.

Figure 4:
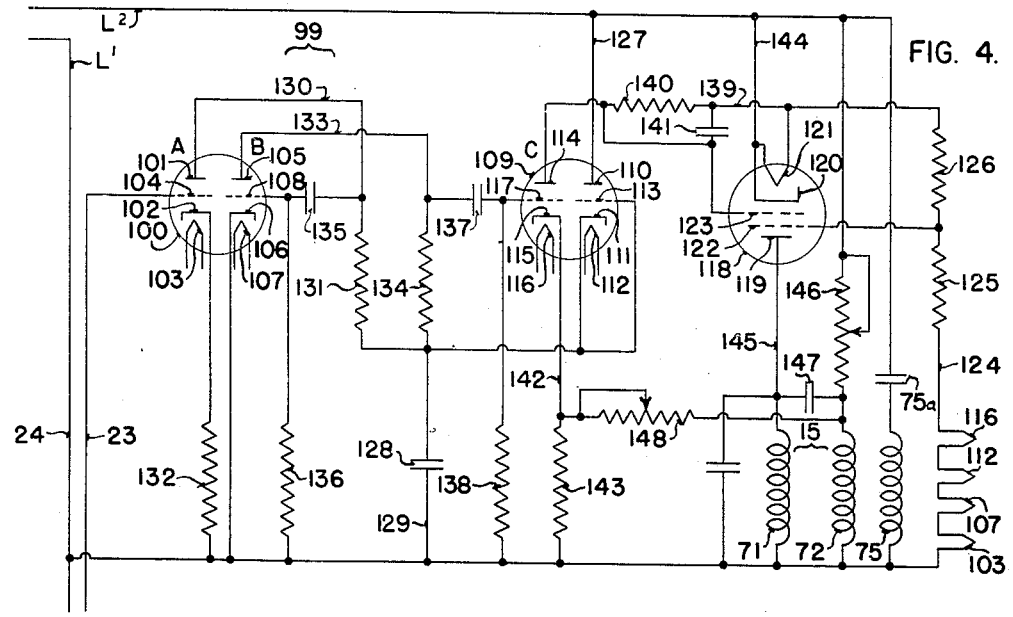
Figs. 3 and 4 illustrate modifications of the arrangement of Fig. 1.

In Fig. 4, I have illustrated more or less diagrammatically a modified amplifier arrangement for controlling the driving means for rebalancing the measuring circuits of the Figs. 1 and 3 arrangements in a minimum of time without overshooting. As illustrated, an electronic amplifier 99 is employed in lieu of the amplifiers 16 or 16' of the Figs. 1 and 3 arrangements, respectively, and both neon lamps 77 and 78 have been dispensed with in deriving an electromotive force proportional to the speed of rotation of the driving system. This electromotive force moreover, is impressed into a later stage of the amplifier circuit employed instead of into the input circuit thereof as in the prior arrangements described, although it may be impressed on the input circuit if desired.

Specifically, the amplifier 99 includes an electronic valve 100 which as shown is a twin amplifier type including two triodes in one envelope. The voltage induced in the pick-up coil 9 of the Fig. 1 arrangement or the unbalanced voltage of the bridge network 84 of the Fig. 3 arrangement is impressed by conductors 23 and 24 on the input circuit of one of the triodes of valve 100. For convenience in describing the circuit connections this triode will be referred to hereinafter as the triode A and the second mentioned triode will be referred to as the triode B. The triode A includes an anode 101, cathode 102, a heater filament 103 and a control grid 104, and the triode B includes an anode 105, a cathode 106, a heater filament 107 and a control grid 108. Energizing current is supplied heater filaments 103 and 107 through a circuit which includes the heater filaments 112 and 116 of a twin type electronic valve 109, and the heater filament 121 of an electronic valve 118, and may be traced from the supply conductor $L^1$ to the heater filaments 103, 107, 112, 116, a conductor 124 in which a pair of resistances 125 and 126 are inserted, and the heater filament 121 to the supply conductor $L^2$. One triode section of valve 109 includes an anode 110, a cathode 111, a heater filament 112 and a control grid 113 which, as shown, is connected directly to the cathode, and the other triode section includes an anode 114, a cathode 115, a heater filament 116 and a control grid 117.

For convenience the latter triode will hereinafter be referred to as the triode C.

Direct current anode voltage is supplied both triode sections of valve 100 through a circuit which utilizes the rectifying action of the first mentioned triode section of valve 109, and may be traced from the supply conductor L² to a conductor 127, the anode 110 and cathode 111 to one terminal of a condenser 128 which constitutes the positive side of a half wave rectifier unit. The negative terminal of condenser 128 is connected by conductor 129 to the supply conductor L¹ and as will be apparent the condenser 128 operates to smooth out the pulsations in the rectified current flow through the circuit including the anode 110 and cathode 111 of valve 109 which impresses a definite constant voltage across its terminals.

As illustrated, the anode 100 of triode A is connected to the positive terminal of condenser 128 by a conductor 130 in which a resistance 131 is inserted and the cathode 102 is connected to the negative terminal of the condenser through a biasing resistance 132. Similarly, the anode 105 of triode B is connected by a conductor 133, in which a resistance 134 is inserted, to the positive terminal of condenser 128, and the cathode 106 is connected directly to the negative terminal of the condenser.

The output circuit of triode A is resistance capacity coupled by a condenser 135 and a resistance 136 to the input circuit of the triode B, and the output circuit of triode B is resistance capacity coupled by a condenser 137 and a resistance 138 to the input circuit of the triode C of valve 109. Anode voltage is supplied the triode C directly from the alternating current supply conductors L¹ and L² through a circuit which may be traced from the supply conductor L² to the heater filament 121 of valve 118, conductor 139, in which a resistance 140 shunted by a condenser 141 is inserted, anode 114, cathode 115, and a conductor 142, in which a biasing resistance 143 is inserted, to the supply conductor L¹. Condenser 141 connected across resistance 140 is employed for smoothing out the pulsating current flows through resistance 140 so that when an alternating potential in phase with the supply line voltage is impressed on the input circuit of the triode section C, the potential drop across resistance 140 will gradually increase in value until a condition of equilibrium is reached, and when an alternating potential 180° out of phase with the supply line voltage is impressed on the input circuit of this triode, the potential drop across resistance 140 will gradually decrease in value. It is thus seen that a direct current potential is maintained across resistance 140 which varies in magnitude in accordance with the phase and magnitude of an alternating signal impressed on the input circuit of amplifier 99 by conductors 23 and 24. When an alternating voltage is applied to the input circuit of triode A, the latter will be alternately rendered conductive and non-conductive, and accordingly a pulsating potential drop will be produced across resistance 131 to alternately raise and lower the potential of the control grid 108 of triode B relatively to the cathode 106. Triode B will then be alternately rendered non-conductive and conductive, respectively, to produce a pulsating potential drop across resistance 134, and thereby to alternately raise and lower the potential of the control grid 117 in the triode C relatively to the cathode 115. Depending upon the phase relation of the pulsating potential applied to the control grid 117 with respect to the alternating voltage impressed on the anode 114, that is depending upon whether the two voltages are in phase or displaced 180° in phase, the triode C will be rendered more conductive or less conductive during the half cycles when the anode 114 is positive, and the potential drop across resistance 140 will be varied to a corresponding extent.

As illustrated, the negative end of resistance 140 is connected to the control grid 123 of valve 118, and the anode circuit of the latter is connected across the alternating supply conductors in an inverted position with respect to the connection thereacross of the anode circuit of the triode C. The anode circuit of valve 118 may be traced from the supply line L² to a conductor 144, cathode 120, anode 119 and a conductor 145 to one terminal of the phase winding 71 of motor 15. The other terminal of the motor winding 71 is connected to the supply conductor L¹. Valve 124 also includes a screen grid 122 which is connected to a point of suitable potential in the network, and as shown may be connected to the point of connection of resistances 125 and 126. Valve 118, therefore, is arranged to be energized directly from the alternating current supply conductors L¹ and L², and the pulsating current conducted by this valve is adapted to be varied in accordance with the magnitude of the direct current potential maintained across resistance 140.

The motor 15 shown in this arrangement may be exactly like the motor 15 employed in the Fig. 1 arrangement, and illustrated in detail in Fig. 2. One winding 71, as mentioned hereinbefore, is adapted to be energized by the pulsating current conducted by valve 118, and another phase winding 72 is adapted to be continuously energized from the alternating current supply conductors L¹ and L² through a resistance 146 which is adjustable in value. The third motor winding 75 is also adapted to be continuously energized from the supply conductors L¹ and L², and is connected to said conductors through a condenser 75a. A condenser 147 is connected between the anode 119 of valve 118 and the point of connection of winding 72 with resistance 146.

Thus, when the effective conductivity of valve 118 is approximately equal to the conductivity of resistance 146, the torque developed by winding 71 for producing rotation of motor 15 will be equal and opposite to the torque developed by the winding 72 and consequently the motor will remain stationary. When the anode to cathode resistance of valve 118 is increased or decreased, however, the torque developed by winding 71 will increase and decrease, respectively, and the motor will be actuated for rotation in a corresponding direction.

In this arrangement means are provided for preventing hunting of the motor 15 in the form of a connection between the point of engagement of motor winding 72 and resistance 146, and the cathode 115 of triode C, which connection includes an adjustable resistance 148. This connection impresses a biasing voltage across resistance 143 in the cathode circuit of triode C, which biasing voltage varies proportionately with the speed of rotation of motor 15 and is of polarity depending upon the direction of rotation of the motor, so that as the motor gains speed a voltage is impressed on resistance 143 which renders the signal impressed on the control grid 117 by triode B insufficient to control the conductivity of the triode C, and tends to energize motor 15 for rotation in the opposite direction. As the motor speed subsequently falls off the voltage through resistance 148 diminishes and as a result the effect of the input signal impressed on the triode C by the triode B is again increased. This action continues as in the previous arrangements described until the primary network 5 or 84 is rebalanced and permits rebalancing without overshooting taking place. The degree of damping obtained may be varied by adjustment of the value of resistance 148.

Figure 5:
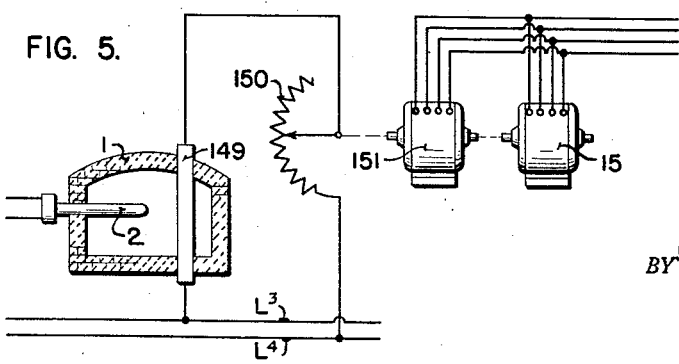
Fig. 5 is a diagrammatic illustration of the use of the invention in a control system.

It will be apparent the motor 15 may be employed to operate a control valve for controlling the supply of heating agent to the furnace 1 of the Fig. 1 arrangement to the temperature of which the thermocouple 2 is responsive, or another motor desirably operated together with the motor 15 may be so employed. For example, as shown in Fig. 5, the furnace 1 to the heat of which the thermocouple 2 is responsive is heated by a resistance 149 which is connected to electric supply conductors L³ and L⁴ through a rheostat 150, the adjustment of which is effected by motor 151. The motor 151 may be exactly like motor 15 and is connected in parallel therewith. The mechanical connection of the rheostat 150 to the motor 151 is such as to increase and decrease the supply of electric current to the resistance 149 as the temperature to which the thermocouple 2 is responsive drops below or rises above a predetermined level.

Subject matter disclosed in this application and not claimed is being claimed in a copending application of Thomas R. Harrison, Serial No. 231,565, filed September 24, 1938 for Measuring and control apparatus, and a copending application of Frederick W. Side, Serial No. 231,567, filed September 24, 1938 for Measuring and control apparatus.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. A system comprising an electrical network, means for producing an unbalanced electrical effect in said network, a device adjustable to reduce said unbalanced electrical effect, a motor for adjusting said device, said motor having a winding, a detector responsive to said unbalanced electrical effect and having a connection to said winding for controlling the selective energization thereof, means for establishing a magnetic field in said motor which does not normally link the turns of said winding but is adapted to be distorted on rotation of said motor to produce an electrical effect in said winding, and means for arresting the operation of said motor substantially at a desired point including an electrical connection directly opposing said last mentioned electrical effect to said unbalanced electrical effect.

2. A system comprising an electrical network, means for producing an unbalanced electrical effect in said network, a device adjustable to reduce said unbalanced electrical effect, a motor for adjusting said device, said motor having a winding, a detector responsive to said unbalanced electrical effect and having a connection to said winding for controlling the selective energization thereof, and means for arresting the operation of said motor substantially at a desired point including means for producing an electrical effect in said winding, and an electrical connection including a gaseous discharge lamp therein opposing said last mentioned electrical effect to said unbalanced electrical effect.

3. A system comprising an electrical network, means for producing an unbalanced electromotive force in said network, a device adjustable to reduce said unbalanced electromotive force, a motor for adjusting said device, said motor having a winding, a detector under control of said unbalanced electromotive force connected to said winding and controlling the selective energization thereof, means for establishing a magnetic field in said motor which does not normally link the turns of said winding but is adapted to be distorted on rotation of said motor to cause the induction of an electromotive force in said winding, and means for arresting the operation of said motor substantially at a desired point including an electrical connection directly opposing said induced electromotive force to said unbalanced electromotive force.

4. A system comprising an electrical network, means for producing an unbalanced electromotive force in said network, a device adjustable to reduce said unbalanced electromotive force, a motor for adjusting said device, said motor having a winding, a detector under control of said unbalanced electromotive force connected to said winding and controlling the selective energization thereof, and means for arresting the operation of said motor at a desired point including means for inducing an electromotive force in said winding and an electrical connection including a gaseous discharge lamp therein opposing said induced electromotive force to said unbalanced electromotive force.

5. A system comprising an electrical network, means for producing an unbalanced electromotive force in said network, a device adjustable to reduce said unbalanced electromotive force, a motor for adjusting said device, said motor having a pair of windings, means for establishing a magnetic field in said motor which field does not normally link the turns of said windings to any substantial extent, but is adapted on energization of said windings to react therewith to produce rotation of said motor in one direction or the other and to thereby cause the induction of an electromotive force in at least one of said windings, a detector responsive to said unbalanced electromotive force and having a connection to said windings for controlling the selective energization thereof, and means for arresting the network regulation substantially at a desired point including an electrical connection directly opposing said induced electromotive force to said unbalanced electromotive force.

6. A system comprising an electrical network, means for producing an unbalanced electromotive force in said network, a device adjustable to reduce said unbalanced electromotive force, a motor for adjusting said device, said motor having a pair of windings, means for establishing a magnetic field in said motor which field does not normally link the turns of said windings to any substantial extent, but is adapted on energization of said windings to react therewith to produce rotation of said motor in one direction or the other and to thereby cause the induction of an electromotive force in at least one of said windings, a detector responsive to said unbalanced electromotive force and having a connection to said windings for controlling the selective energization thereof, and means for arresting the network regulation substantially at a desired point including an electrical connection including a gaseous discharge lamp therein opposing said induced electromotive force to said unbalanced electromotive force.

7. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and connected to both of said windings for controlling the selective energization thereof, means for establishing a magnetic field in said motor which field does not normally link the turns of said first mentioned winding to any substantial extent but is adapted on energization of said windings to react therewith to produce rotation of said motor in one direction or the other and to thereby cause the induction of an electromotive force in said first mentioned windings, and means for arresting the operation of said motor substantially at a desired point including an electrical connection directly opposing said induced electromotive force to said unbalanced electromotive force.

8. A system comprising an electrical network, means for producing an unbalanced electromotive force in said network, a device adjustable to reduce said unbalanced electromotive force, a motor for adjusting said device, said motor having at least three windings, a detector responsive to said unbalanced electromotive force and connected to two of said windings for controlling the selective energization thereof, means for energizing the other of said windings to establish a magnetic field in said motor which field does not normally link the turns of said first mentioned windings to any substantial extent but is adapted on energization of said first mentioned windings to react therewith to produce rotation of said motor in one direction or the other and to thereby cause the induction of an electromotive force in said first mentioned windings, and means for arresting the operation of said motor substantially at a desired point including an electrical connection including a gaseous discharge lamp therein opposing said induced electromotive force to said unbalanced electromotive force.

9. A system comprising an electrical network, means for producing an unbalanced electromotive force in said network, a device adjustable to reduce said unbalanced electromotive force, a motor for adjusting said device, said motor having at least three windings, a detector responsive to said unbalanced electromotive force and connected to two of said windings for controlling the selective energization thereof, means for energizing the other of said windings to establish a magnetic field in said motor which field does not normally link the turns of said first mentioned windings to any substantial extent but is adapted on energization of said first mentioned windings to react therewith to produce rotation of said motor in one direction or the other and to thereby cause the induction of an electromotive force in said first mentioned windings, and means for arresting the operation of said motor substantially at a desired point including an electrical connection including a gaseous discharge lamp and a resistance therein opposing said induced electromotive force to said unbalanced electromotive force.

10. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and connected to said windings for controlling the selective energization thereof to produce rotation of said motor in one direction or the other, means for establishing a magnetic field in said motor which does not normally link the turns of said windings but is adapted to be distorted on rotation of said motor to cause the induction of an electromotive force in said windings, and means for arresting the operation of said motor substantially at a desired point including an electrical connection directly opposing said induced electromotive force to said unbalanced electromotive force.

11. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and connected to said windings for controlling the selective energization thereof to produce rotation of said motor in one direction or the other, and means for arresting the operation of said motor substantially at a desired point including means for deriving an electromotive force from said windings and an electrical connection including a gaseous discharge lamp therein opposing said induced electromotive force to said unbalanced electromotive force.

12. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and connected to said windings for controlling the selective energization thereof to produce rotation of said motor in one direction or the other, and means for arresting the operation of said motor substantially at a desired point including means for deriving an electromotive force from said windings and an electrical connection including a pair of gaseous discharge lamps therein opposing said induced electromotive force to said unbalanced electromotive force.

13. A system comprising an electrical network, means for producing an unbalanced electromotive force in said network, a device adjustable to reduce said unbalanced electromotive force, a motor for adjusting said device, said motor having at least two windings, a detector responsive to said unbalanced electromotive force and connected to said windings for controlling the selective energization thereof, means for establishing a magnetic field in said motor which field does not normally link the turns of said windings to any substantial extent but is adapted to be distorted on rotation of said motor to cause the induction of an electromotive force in each of said windings, and, a connection including a gaseous discharge lamp from each of said windings to said detector to apply said induced electromotive forces to said detector for arresting the operation of said motor substantially at a desired point.

14. A system comprising an electrical network, means for producing an unbalanced electromotive force in said network, a device adjustable to reduce said unbalanced electromotive force, a motor for adjusting said device, said motor having a rotatable armature and at least two windings, a detector responsive to said unbalanced electromotive force and connected to said windings for controlling the selective energization thereof, means for establishing a magnetic field in said motor which field does not normally link the turns of said windings to any substantial extent, but is adapted to link the turns of said windings on rotation of said armature, and means for arresting the operation of said motor including a circuit part having a gaseous discharge lamp connected therein connecting one of said windings to said detector for controlling the latter.

15. A system comprising an electrical network, means for producing an unbalanced electromotive force in said network, a device adjustable to reduce said unbalanced electromotive force, a motor for adjusting said device, said motor having a rotatable armature and at least two windings, a detector responsive to said unbalanced electromotive force and connected to said windings for controlling the selective energization thereof, means for establishing a magnetic field in said motor which field does not normally link the turns of said windings to any substantial extent, but is adapted to link the turns of said windings on rotation of said armature, and means for arresting the operation of said motor including a circuit part including a pair of gaseous discharge lamps connected therein connecting said windings to said detector for controlling the latter.

16. The combination with an electrical network having an electrical characteristic thereof to be regulated, of an electrical driving motor, an impedance connected in said network and adapted to be adjusted by said motor to restore said electrical characteristic to a predetermined state on deviation of said electrical characteristic therefrom, a device responsive to the state of said electrical characteristic, said motor having a winding connected to said device, and means for arresting the network regulation substantially at a desired point including means for deriving an electrical effect from said winding and a circuit part including a gaseous discharge device applying said electrical effect to control said device.

17. The combination with an electrical network having an electrical characteristic thereof to be regulated of an electrical driving motor, an impedance connected in said network and adapted to be adjusted by said motor to restore said electrical characteristic to a predetermined state on deviation of said electrical characteristic therefrom, a device responsive to the state of said electrical characteristic, said motor having a winding connected to said device, and means for arresting the network regulation substantially at a desired point including means for inducing an electromotive force in said winding and a circuit part including a gaseous discharge lamp applying said electromotive force to control said device.

18. The combination with an electrical network having an electrical characteristic thereof to be regulated, of an electrical driving motor, an impedance connected in said network and adapted to be adjusted by said motor to restore said electrical characteristic to a predetermined state on deviation of said electrical characteristic therefrom, a device responsive to the state of said electrical characteristic, said motor having at least three windings, two of which are energized by said device, means for energizing the other of said windings to establish a magnetic field in said motor, which field does not normally link the turns of said first-mentioned windings to any substantial extent but is adapted on energization of said first-mentioned windings to react therewith to produce rotation of said motor and to thereby cause the induction of an electromotive force in said first mentioned windings, and means for arresting the network regulation substantially at a desired point including a circuit part directly applying said electromotive force to control said device.

19. The combination with an electrical network having an electrical characteristic thereof to be regulated, of an electrical driving motor, an impedance connected in said network and adapted to be adjusted by said motor to restore said electrical characteristic to a predetermined state on deviation of said electrical characteristic therefrom, a device responsive to the state of said electrical characteristic, said motor having at least three windings, two of which are energized by said device, means for energizing the other of said windings to establish a magnetic field in said motor, which field does not normally link the turns of said first-mentioned windings to any substantial extent but is adapted on energization of said first-mentioned windings to react therewith to produce rotation of said motor in one direction or the other and to thereby cause the induction of an electromotive force in said first mentioned windings, and means for arresting the network regulation substantially at a desired point including a circuit part including a gaseous discharge lamp applying said electromotive force to control said device.

WALTER P. WILLS.